(12) United States Patent
Scicluna

(10) Patent No.: US 9,055,798 B2
(45) Date of Patent: Jun. 16, 2015

(54) RFID-SHIELDED ARTICLES AND METHODS THEREOF

(71) Applicant: Tumi, Inc., South Plainfield, NH (US)

(72) Inventor: Paul V. Scicluna, Penndel, PA (US)

(73) Assignee: TUMI, INC., South Plainfield, NJ (US)

( * ) Notice: Subject to any disclaimer, the term of this patent is extended or adjusted under 35 U.S.C. 154(b) by 0 days.

(21) Appl. No.: 13/756,108

(22) Filed: Jan. 31, 2013

(65) Prior Publication Data

US 2014/0034520 A1  Feb. 6, 2014

Related U.S. Application Data

(60) Provisional application No. 61/593,257, filed on Jan. 31, 2012.

(51) Int. Cl.
```
A45C 3/02      (2006.01)
A45C 13/00     (2006.01)
A45C 1/00      (2006.01)
A45C 1/06      (2006.01)
A45C 13/18     (2006.01)
H01Q 1/22      (2006.01)
H01Q 1/52      (2006.01)
H01Q 17/00     (2006.01)
```
(52) U.S. Cl.
CPC ............... *A45C 13/002* (2013.01); *A45C 13/00* (2013.01); *A45C 1/00* (2013.01); *A45C 1/06* (2013.01); *A45C 13/185* (2013.01); *H01Q 1/2225* (2013.01); *H01Q 1/526* (2013.01); *H01Q 17/00* (2013.01)

(58) Field of Classification Search
CPC ........... G06K 19/07327; A45C 13/185; A45C 2001/065
USPC ............ 150/124, 134, 102; 190/101; 174/350
See application file for complete search history.

(56) References Cited

U.S. PATENT DOCUMENTS

```
6,121,544  A  *  9/2000  Petsinger ................ 174/353
7,482,925  B2 *  1/2009  Hammad et al. ......... 340/572.1
7,889,056  B2 *  2/2011  Horne ..................... 340/10.1
```
(Continued)

FOREIGN PATENT DOCUMENTS

```
DE    102004029132 A1 *  12/2005
JP    2009135143    A  *   6/2009
```

OTHER PUBLICATIONS

Form PCT/ISA/220, "Notification of Transmittal of the International Search Report and Written Opinion . . . ", for PCT/US2013/024165, Mailed Jun. 18, 2013, 2 Pgs.

(Continued)

*Primary Examiner* — Sue A Weaver
(74) *Attorney, Agent, or Firm* — Lando & Anastasi, LLP

(57) ABSTRACT

Embodiments of the present disclosure generally relate to RFID-shielded articles and methods thereof. In one embodiment, a wallet is provided that may comprise an inner layer having a foldable portion; an outer layer comprising RFID shielding material adapted to block a radio signal, the outer layer comprising a foldable portion adapted to cooperate with the foldable portion of the inner layer, the outer layer attached to the inner layer; a pocket formed between the outer layer and the inner layer, the pocket having an opening adapted to receive currency; and a card holder disposed on the inner layer, the card holder adapted to receive a card comprising an RFID tag.

13 Claims, 4 Drawing Sheets

(56) References Cited

U.S. PATENT DOCUMENTS

| | | | |
|---|---|---|---|
| 7,918,335 B1* | 4/2011 | Kitchen | 206/38 |
| 2007/0289775 A1 | 12/2007 | Potts et al. | |
| 2009/0207976 A1* | 8/2009 | Ito | 378/156 |
| 2009/0272570 A1* | 11/2009 | Chen | 174/350 |

OTHER PUBLICATIONS

Form PCT/ISA/210, "International Search Report", for PCT/US2013/024165, Mailed Jun. 28, 2013, 3 Pgs.

Form PCT/ISA/237, "Written Opinion of the International Searching Authority", for PCT/US2013/024165, Mailed Jun. 18, 2013, 6 Pgs.

* cited by examiner

RFID-SHIELDED ARTICLES AND METHODS THEREOF

CROSS-REFERENCE TO RELATED APPLICATIONS

This application claims priority to provisional patent application Ser. No. 61/593,257, filed Jan. 31, 2012, entitled "RFID-Shielded Articles and Methods Thereof," the disclosure of which is incorporated by reference herein in its entirety.

BACKGROUND

1. Field of the Invention

Embodiments of the present disclosure generally relate to RFID-shielded articles and methods thereof. More specifically, embodiments of the present disclosure relate to secure articles, such as wallets, passport holders, bags, purses, backpacks, or the like, having at least one pocket or portion therein being equipped with RFID shielding material to prevent theft of identification and/or financial information.

2. Description of the Related Art

Identity theft has become an increasingly common problem in today's largely electronic transaction and payment processing infrastructure. With the increase of non-cash based financial transactions, such as credit card or debit card transactions, the number of fraudulent transactions has increased as well. A consumer's payment device (e.g., credit card, debit card, ATM card, etc.) associated with the consumer's accounts, can be compromised, allowing thieves to have unlimited access to the consumer's associated accounts, until fraud has been detected and the accounts or payment devices canceled. One increasingly common method of compromising a consumer's payment device is wireless identity theft.

Wireless identity theft, also known as contactless identity theft or radio frequency identification ("RFID") identity theft, includes compromising an individual's personal identifying information or financial information using wireless technology. Many individuals use radio frequency-enabled cards, including some credit, debit, or government issued identification cards that carry a radio frequency identification chip susceptible to wireless identity theft. When these chips come into contact with radio waves, the response can contain encoded personal identifying information, including the card holder's name, address, Social Security number, phone number, and pertinent account or employee information. Wireless identity thieves are able to capture information stored on these RF-enabled cards using radio waves. Thus, there is a need for secure articles, such as wallets, passport holders, bags, purses, backpacks, or the like, having at least one pocket or portion therein being equipped with RFID shielding material to prevent theft of identification and/or financial information.

SUMMARY

Embodiments of the present disclosure generally relate to RFID-shielded articles and methods thereof. More specifically, embodiments of the present disclosure relate to secure articles, such as wallets, passport holders, bags, purses, backpacks, or the like, having at least one pocket or portion therein being equipped with RFID shielding material to prevent theft of identification and/or financial information.

In one embodiment of the present disclosure, a wallet may comprise an inner layer having a foldable portion; an outer layer comprising RFID shielding material adapted to block a radio signal, the outer layer comprising a foldable portion adapted to cooperate with the foldable portion of the inner layer, the outer layer attached to the inner layer; a pocket formed between the outer layer and the inner layer, the pocket having an opening adapted to receive currency; and a card holder disposed on the inner layer, the card holder adapted to receive a card comprising an RFID tag.

In another embodiment of the present disclosure, a bag may comprise an outer layer surrounding a primary pocket, the outer layer having an opening formed therein adapted to allow access to the pocket; a auxiliary pocket disposed on at least one of the outer layer and a surface inside the primary pocket, at least one of the auxiliary pocket and the outer layer comprising RFID shielding material adapted to block a radio signal; and a handle attached to the outer layer adapted to allow the bag to be carried.

In another embodiment of the present disclosure, a passport cover may comprise an outer layer comprising RFID shielding material adapted to block a radio signal, the outer layer comprising a foldable portion; and a pocket disposed on an inner surface of the outer layer, the pocket having an opening adapted to receive a passport

BRIEF DESCRIPTION OF THE DRAWINGS

So the manner in which the above recited features of the present disclosure can be understood in detail, a more particular description of embodiments of the present disclosure, briefly summarized above, may be had by reference to embodiments, which are illustrated in the appended drawings. It is to be noted, however, the appended drawings illustrate only typical embodiments of embodiments encompassed within the scope of the present disclosure, and, therefore, are not to be considered limiting, for the present disclosure may admit to other equally effective embodiments, wherein.

Figure 1:
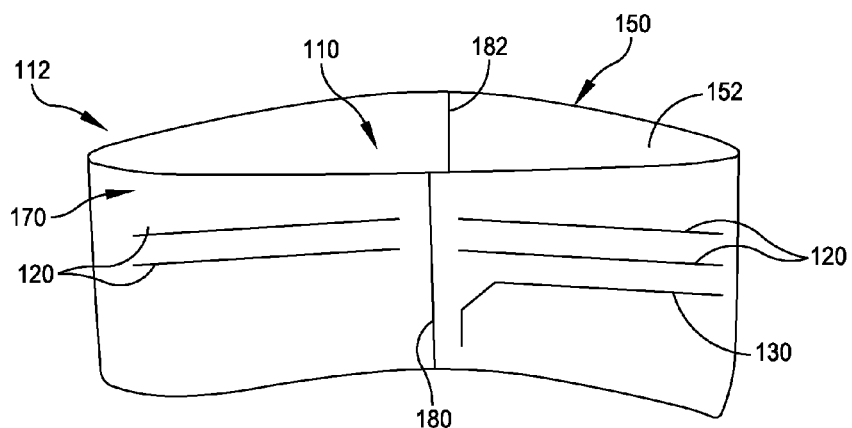
FIG. 1 depicts a perspective view of a wallet in accordance with one embodiment of the present disclosure.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present disclosure generally relate to RFID-shielded articles and methods thereof. More specifically, embodiments of the present disclosure relate to secure articles, such as wallets, passport holders, bags, purses, backpacks, or the like, having at least one pocket or portion therein being equipped with RFID shielding material to prevent theft of identification and/or financial information.

FIG. 1 depicts a wallet 100 in accordance with one embodiment of the present disclosure. As shown in the Figure, a wallet 100 may generally comprise a primary pocket 110 where cash is typically kept, one or more card holders 120, and usually at least one miscellaneous pocket 130. The wallet 100 may comprise an inner layer 170 having a foldable portion 180 and an outer layer 150 having a foldable portion 182. The foldable portion 182 of the outer layer 150 may be adapted to cooperate with the foldable portion 180 of the inner layer 170, allowing the wallet 100 to be folded substantially in half. In some embodiments, the foldable portions 180, 182 may form a center crease in the wallet 100.

In exemplary embodiments, the inner layer 170 and the outer layer 150 may be attached at points along the outer edges, thereby forming the pocket 110 and an opening 112 adapted to allow access to the pocket 110. The pocket 110 may generally be lined with a liner material 152. The card holders 120 and/or miscellaneous pocket 130 may be disposed on the inner layer 170. In exemplary embodiments, the card holders 120 may be adapted to accept cards having an RFID tag attached thereto and/or embedded therein. The miscellaneous pocket 130 may be adapted to receive an identification card and/or alternative cards having an RFID tag attached thereto and/or embedded therein. In some embodiments, the pockets 120, 130 may have a fastener adapted to secure the pockets 120, 130 in a closed position. By way of example, a fastener adapted to secure the pockets 120, 130 in a closed position may include a zipper, a snap, a hook/loop fastener, and/or the like.

In many embodiments the wallet 100 may be formed from leather, or similar material, that has the durability to be used every day, and be taken in and out of an individual's pocket. When the wallet 100 is in an open position, as shown, the outer layer 150 forms only one side of the exposed wallet, i.e., the back of the wallet as depicted. As such, the outer layer 150 and the inner layer 170 may form opposite sides of the wallet 100 when the wallet 100 is in an open position. However, when the wallet 100 is in a closed position, and is folded along the foldable portions 180, 182, the outer layer 150 may become the only exposed surface of the wallet 100. As such, in many embodiments of the present disclosure, the outer layer 150 of the wallet 100 becomes desirable to protect with RFID shielding, as such shielding will protect the entire contents of the wallet 100 when in a closed position. Accordingly, the outer layer 150 may comprise RFID shielding material adapted to block and/or shield at least one radio signal. In some embodiments, at least a portion of the inner layer 170 may comprise RFID shielding material to add additional protection to the contents of the wallet 100 when in an open position.

In accordance with embodiments of the present disclosure, a RFID shielding material may be utilized to secure the articles utilized within the wallet 100. The RFID shielding material may be adapted to block at least one radio wave/signal. For the embodiment depicted in FIG. 1, RFID shielding material may comprise a sheet or blank of material positioned inside the wallet 100, placed in between the outer layer 150 and the liner 152 of the primary pocket 110. In such embodiments, the RFID shielding material may be affixed to the wallet 100 using any means suitable for embodiments of the present disclosure. For example, using adhesive, sewing, mechanical fasteners, or the like, may all be suitable and effective means to affix the RFID shielding material therein. However, in certain embodiments, the RFID shielding material may be form fit within the outer layer 150 and liner 152, such that the sealed pocket formed by the outer layer 150 and liner 152 are sufficient to hold the RFID shielding material in place. Alternatively, the outer layer 150 may comprise RFID shielding material or may be attached directly to RFID shielding material. For example, the outer layer 150 may comprise a number of sub-layers, including a leather and/or textile layer disposed on the outside surface of the wallet 100 and an RFID shielding material layer attached to the leather and/or textile layer. In some embodiments, the liner 152 for lining the pocket 110 may comprise RFID shielding material. The liner 152 may also comprise a textile layer and an RFID shielding material layer attached thereto.

In embodiments, the RFID shielding material may be utilized on the interior of any of the card holders 120, or within the miscellaneous pocket 130. When used with such other features, it may not be necessary to hide the RFID shielding material between two layers, but rather merely line the inner surface of such holders and/or pockets. In many embodiments, the RFID shielding material may comprise any material capable of inherently disrupting certain frequencies, on which passive or active RFID chips commonly operate. For example, the shielding material may be adapted to block an interrogating signal from an RFID reader/scanner and/or an identification signal from an RFID tag. Additionally, in many embodiments, the RFID shielding material may comprise the ability to disrupt any RFID chips or readers operating with or under any known standard for RFID operation, for example: ISO/IEC 14443 (i.e., HF (13.56 MHZ) standard for HighFIDs used as the basis of RFID—enabled passports under ICAO 9303); ISO/IEC 15693 (i.e., HF (13.56 MHZ) standard for HighFIDs widely used for non-contact smart payment and credit cards); ISO14223 (i.e., Radiofrequency identification of animals—Advanced transponders); Near Field Communication standards (i.e., mobile devices act as RFID readers/transponders, similar to ISO/IEC 14443); ISO/IEC 18000 (i.e., radio frequency identification for item management); ISO/IEC 18092 (i.e., telecommunications and information exchange between systems, for example, Near Field Communication-Interface and Protocol (NFCIP-1)); ISO18185 (i.e., electronic seals or "e-seals" for tracking cargo containers using the 433 MHZ and 2.4 GHZ frequencies); or ISO/IEC 21481 (i.e., Telecommunications and information exchange between systems—Near Field Communication Interface and Protocol-Z).

While the RFID shielding material may comprise any material suitable for embodiments of the present disclosure, there are numerous additional factors beyond mere shielding that must be considered. For example, in many embodiments, cost, weight, sensitivity, or the like, also come into play when selecting a proper RFID shielding material. In one embodiment of the present disclosure, the RFID shielding material comprises a metal or metal alloy, such as aluminum, which may be provided in sheet or foil form. In another embodiment, the RFID shielding material comprises a blend of multiple different metals, such as a mix of aluminum, steel, copper, nickel, or the like. In yet another embodiment, a blend of metal and non-metal materials may be utilized, such as a blend of synthetic fibers and metals.

In one embodiment, the RFID shielding material comprises a blend of polyester, copper and nickel. Polyester may be provided in between about 40-80%, the copper may be provided between about 10-40%, and the nickel may be provided in between about 2-20%. In an exemplary embodiment, the RFID shielding material may comprise about 67% polyester, 25% copper, and 8% nickel. As utilized with additional embodiments described herein, the RFID shielding material may comprise any of the aforementioned combinations of composition, provided such compositions perform the requisite function of active and/or passive RFID shielding as described herein.

Figure 2:
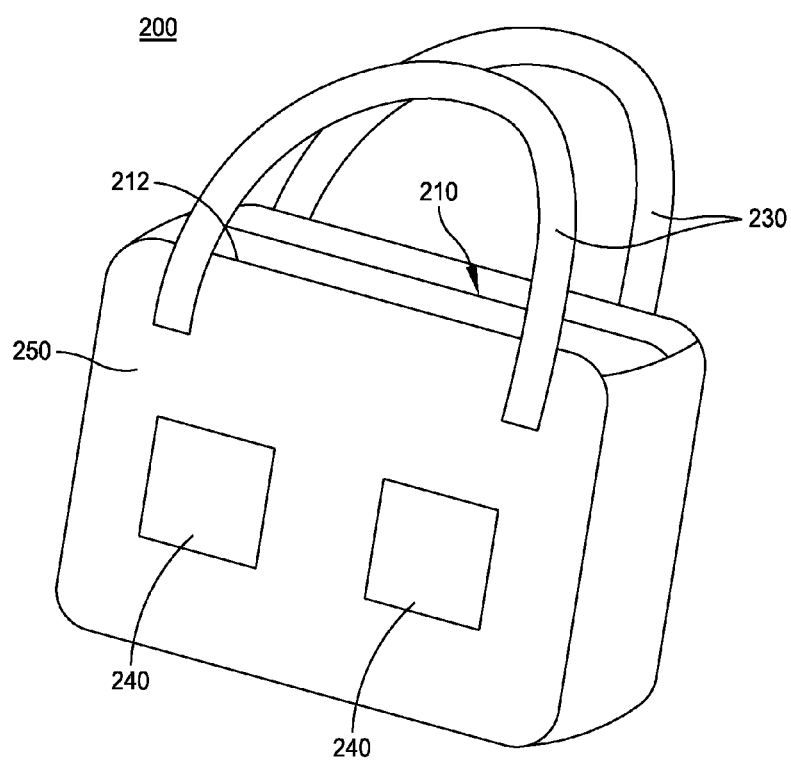
FIG. 2 depicts a perspective view of a purse in accordance with one embodiment of the present disclosure.

FIG. 2 depicts a front view of a purse/bag 200 in accordance with one embodiment of the present disclosure. A purse 200 may generally comprise an outer layer 250 surrounding a primary pocket 210, the outer layer 250 having an opening 212 formed therein adapted to allow access to the pocket 210. The opening 212 may be disposed on a top surface of the outer layer 250. The opening 212 may be secured in a closed position with a fastener (not shown). The fastener may comprise, for example, a zipper, snaps, a hook/loop fastener, magnets, and/or the like. The purse 200 may also comprise an auxiliary pocket 240 disposed on at least one of the outer layer 250 and a surface inside the primary pocket 210.

In some embodiments, the auxiliary pocket 240 and/or the outer layer 250 may comprise RFID shielding material. The purse 200 may also comprise a handle/strap 230 attached to the outer layer adapted to allow the purse 200 to be carried. In some embodiments, the purse 200 may comprise a card holder disposed on at least one of the outer layer 250 and the primary pocket 210. The card holder may comprise RFID shielding material and may be adapted to receive a card having an RFID tag. A purse 200 may typically be used to store additional articles, such as a wallet, as described herein with respect to FIG. 1. However, in certain instances, it may be beneficial to provide RFID shielding to the purse 200, the primary pocket 210 and/or one or more auxiliary pockets 240 rather than relying upon the protection to the articles themselves.

In embodiments of the present disclosure, the primary pocket 210 may comprise an outer layer 250 and a liner (not shown). In such an embodiment, RFID shielding material may be positioned between the outer layer 250 and liner, rendering the entirety of the primary pocket 210 inaccessible for most intended radiofrequency waves and radio signals. In another embodiment of the present disclosure, one of the auxiliary pockets 240 may be designated as the secure pocket, wherein the RFID shielding material may surround the interior of such pocket 240. In such an embodiment, the RFID shielding material may be fixed to at least the interior side of the front of the auxiliary pocket 240, and along the interior side of a flap thereon (not shown). For such pockets, it may be optional to line a backside of the auxiliary pocket 240, as such pocket abuts the primary pocket 210—that is, in embodiments, only the exterior surfaces of auxiliary pockets 240 may be lined with RFID shielding material, as any security threats would likely be coming from the exterior side only.

Figure 3:
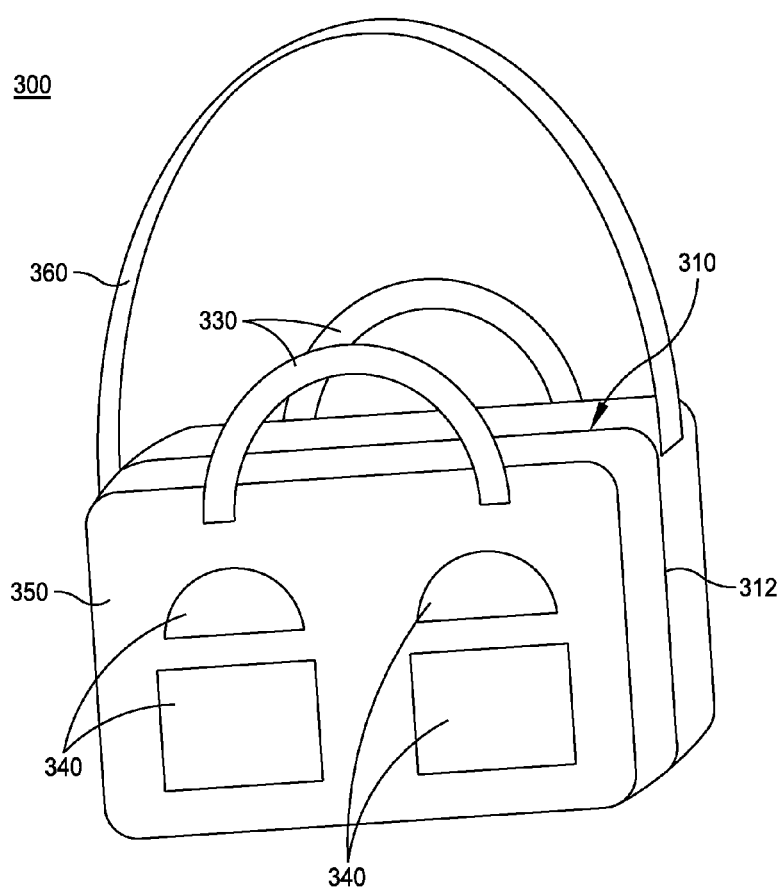
FIG. 3 depicts a perspective view of a bag in accordance with one embodiment of the present disclosure.

FIG. 3 depicts a front view of a bag 300 in accordance with embodiments of the present disclosure. The bag 300 may comprise a briefcase and/or a laptop case. Similar to the purse shown above, a bag 300 generally comprises a primary pocket 310, one or more auxiliary pockets 340, and a handle or strap 330, and an outer layer 350 surrounding the primary pocket 310. The outer layer 350 may have an opening 312 formed therein adapted to allow access to the pocket 310. The opening 312 may be disposed around several sides of the bag and be adapted to allow a laptop or similarly sized item to enter the opening 312 for storage within the pocket 310. For example, the opening 312 may one continuous opening extending from a first lateral side, through a top side, and through a second lateral side, wherein the continuous opening runs around the outer layer 350 of the bag 300. The opening 312 may be secured in a closed position with a fastener (not shown). The fastener may comprise, for example, a zipper, snaps, a hook/loop fastener, magnets, and/or the like.

The purse bag 300 may also comprise an auxiliary pocket 340 disposed on at least one of the outer layer 350 and a surface inside the primary pocket 310. In some embodiments, the auxiliary pocket 340 and/or the outer layer 350 may comprise RFID shielding material adapted to block a radio signal. Exemplary RFID shielding materials are discussed herein with respect to the description of FIG. 2. The bag 300 may also comprise a handle 330 attached to the outer layer adapted to allow the bag 300 to be carried. In some embodiments, the bag 300 may comprise a card holder disposed on at least one of the outer layer 350 and the primary pocket 310. The card holder may comprise RFID shielding material and/or may be adapted to receive a card having an RFID tag.

In addition, the bag 300 may comprise a shoulder strap 360. The shoulder strap 360 may be adapted to attach to at least a portion of the outer layer 350 and support the bag 300 on the shoulder of a user. The bag 300 may typically be used to store additional articles, such as a wallet (such as the wallet described with respect to FIG. 1); however, in certain instances, it may be beneficial to provide RFID shielding to the bag 300, the primary pocket 310 and/or one or more auxiliary pockets 340 rather than relying upon the protection to the articles themselves. As such, each of the manners in which the pockets may be protected, as discussed above with the purse, may be equally effective with the bag 300 shown herein.

Figure 4:
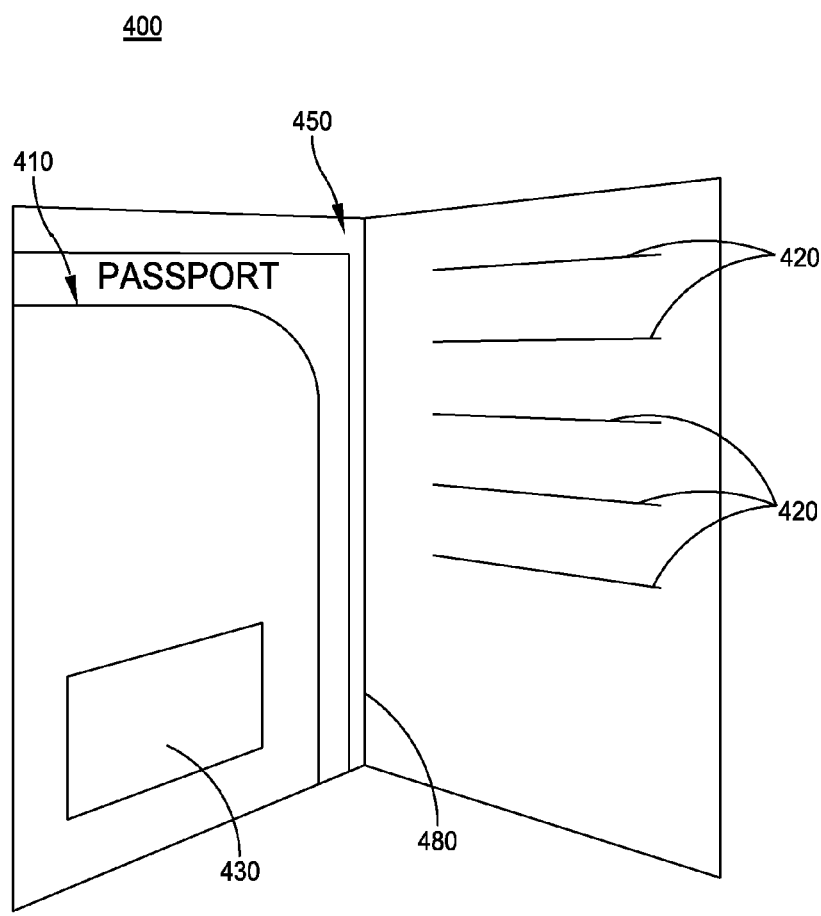
FIG. 4 depicts a perspective view of a passport cover in accordance with one embodiment of the present disclosure.

FIG. 4 depicts a perspective view of a passport cover 400 in accordance with one embodiment of the present disclosure. A passport cover 400 poses a unique risk for security threats due to the fact that most countries have begun issuing RFID-chip embedded passports, for ease of scanning for identification, and for increased security against fake or false passports. Although structurally similar to a wallet, a passport cover may typically have to protect against a higher level of threat beyond credit card thieves. Thus, the security placed around passport cover 400 may be more enhanced than a wallet, bag, or the like.

A passport cover 400, shown in an open position, generally comprises an outer layer 450 and a pocket 410 disposed on an inner surface of the outer layer. The pocket 410 may have an opening adapted to receive a passport. The outer layer 450 may comprise a foldable portion 480 adapted to allow the passport cover 400 to be folded. At least a portion of the outer layer 450 and or the pocket 410 may comprise RFID shielding material. Examples of RFID shielding material are disclosed herein with respect to the description of FIG. 1. In addition, the passport cover 400 may comprise a number of card holders 420 and/or a miscellaneous pocket 430. The primary pocket 410 may be adapted to store at least an individual's passport. The card holders 420 may be adapted to store cards having RFID tags. The miscellaneous pocket 430 may be used to store additional identification, such as a driver's license. Being that each of such pockets and/or holders is intended to hold either financial, personal or security information (i.e., a passport, credit cards, local identification, or the like), in many embodiments, it may be beneficial to line every pocket 410, 420, 430 and/or material/surface/layer 450 with RFID shielding material.

In embodiments of the present disclosure, rather than lining each pocket 410, 420, 430 individually, which may be done within the scope of embodiments herein, the material used to manufacture the passport cover 400 may be pre-lined with such RFID shielding material. For example, before cutting and forming pockets, holders, etc., the leather or cloth used to make the passport cover 400 may be formed to, impregnated with, or otherwise affixed to the RFID shielding material. In such an embodiment, with each component of the passport cover 400 comprising the RFID shielding material thereon, the scope of protection afforded a user thereof is significantly greater to prevent any type of data theft through RFID readers/scanners. In some embodiments, the RFID shielding material may comprise a greater thickness when used with a passport cover 400 and/or may comprise a greater density.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Now that exemplary embodiments of the present disclosure have been shown and described in detail, various modifications and improvements thereon will become readily apparent to those skilled in the art.

It will be understood that one or more of the steps described can be rearranged, separated, and/or combined without deviating from the scope of embodiments of the disclosure. For ease, steps are, at times, presented sequentially. This is merely for ease and is in no way meant to be a limitation.

Further, it will be understood that one or more of the elements and/or exemplary embodiments of the disclosure described can be rearranged, separated, and/or combined without deviated from the scope of the disclosure. For ease, various elements are described, at times, separately. This is merely for ease and is in no way meant to be a limitation.

While the various steps, elements, and/or exemplary embodiments of the disclosure have been outlined above, it is evident that many alternatives, modifications and variations will be apparent to those skilled in the art. The various steps, elements, and/or exemplary embodiments of the disclosure, as set forth above, are intended to be illustrative, not limiting. Various changes can be made without departing from the spirit and scope of the disclosure. Accordingly, the spirit and scope of the present disclosure is to be construed broadly and not limited by the foregoing specification.

No element, act, or instruction used in the description of the present application should be construed as critical or essential to the disclosure unless explicitly described as such. Also, as used herein, the article "a" is intended to include one or more items. Where only one item is intended, the term "one" or similar language is used.

Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. In addition, as used herein, the term "set" is intended to include any number of items, including zero. Further, as used herein, the term "number" is intended to include any number, including zero.

What is claimed is:

1. A wallet comprising:
   an inner layer having a foldable portion;
   an outer layer comprising RFID shielding material adapted to block a radio signal, the outer layer comprising a foldable portion adapted to cooperate with the foldable portion of the inner layer, the outer layer attached to the inner layer;
   a pocket formed between the outer layer and the inner layer, the pocket having an opening adapted to receive currency; and
   a card holder disposed on the inner layer, the card holder adapted to receive a card comprising an RFID tag; and
   wherein the RFID shielding material comprises a blend of polyester, copper, and nickel comprising between about 40% to about 80% polyester, between about 10% to about 40% copper; and between about 2% to about 20% nickel.

2. The wallet of claim 1, wherein the inner layer comprises the RFID shielding material.

3. The wallet of claim 1, wherein the radio signal comprises at least one of an RFID interrogating signal from an RFID reader and an identification signal from an RFID tag.

4. The wallet of claim 1 further comprising a liner for lining the pocket between the outer layer and the inner layer, the liner comprising the RFID shielding material.

5. A bag comprising:
   an outer layer surrounding a primary pocket, the outer layer having an opening formed therein adapted to allow access to the pocket;
   a auxiliary pocket disposed on at least one of the outer layer and a surface inside the primary pocket, at least one of the auxiliary pocket and the outer layer comprising RFID shielding material adapted to block a radio signal; and
   a handle attached to the outer layer adapted to allow the bag to be carried; and
   wherein the RFID shielding material comprises a blend of polyester, copper, and nickel comprising between about 40% to about 80% polyester, between about 10% to about 40% copper; and between about 2% to about 20% nickel.

6. The bag of claim 5, where the bag comprises a purse and the opening is disposed on a top surface of the outer layer.

7. The bag of claim 5, wherein the bag comprises at least one of a laptop case and a briefcase, and the opening is disposed around three sides of the bag.

8. The bag of claim 5, further comprising a card holder disposed on at least one of the outer layer and the primary pocket, the card holder adapted to receive a card comprising an RFID tag.

9. The bag of claim 5, wherein the radio signal comprises at least one of an RFID interrogating signal from an RFID reader and an identification signal from an RFID tag.

10. The bag of claim 5 further comprising a liner for lining the pocket, the liner comprising the RFID shielding material.

11. The bag of claim 5, wherein only the pocket liner comprises the RFID shielding material.

12. A passport cover comprising:
    an outer layer comprising RFID shielding material adapted to block a radio signal, the outer layer comprising a foldable portion; and
    a pocket disposed on an inner surface of the outer layer, the pocket having an opening adapted to receive a passport;
    wherein the RFID shielding material comprises a blend of polyester, copper, and nickel comprising between about 40% to about 80% polyester, between about 10% to about 40% copper; and between about 2% to about 20% nickel.

13. The passport cover of claim 12, further comprising:
    a card holder disposed on the inner surface of the outer layer, the card holder comprising RFID shielding material and adapted to receive a card comprising an RFID tag.

* * * * *

UNITED STATES PATENT AND TRADEMARK OFFICE
CERTIFICATE OF CORRECTION

Page 1 of 1

PATENT NO. : 9,055,798 B2
APPLICATION NO. : 13/756108
DATED : June 16, 2015
INVENTOR(S) : Paul V. Scicluna It is certified that error appears in the above-identified patent and that said Letters Patent is hereby corrected as shown below:

On the title page, item 71

At page 1, Applicant's Address, delete "NH" and replace with --NJ--.

Signed and Sealed this
Third Day of November, 2015

Michelle K. Lee
*Director of the United States Patent and Trademark Office*